United States Patent [19]
Laney

[11] Patent Number: 6,109,617
[45] Date of Patent: Aug. 29, 2000

[54] GAS SEAL ASSEMBLY AND METHOD OF SEALING

[75] Inventor: Frederick Christopher Laney, Baton Rouge, La.

[73] Assignee: Power Packing Co., Inc., Baton Rouge, La.

[21] Appl. No.: 09/034,929

[22] Filed: Mar. 4, 1998

[51] Int. Cl.$^7$ .................................................. F16J 15/54
[52] U.S. Cl. ............................................. 277/369; 277/401
[58] Field of Search .................................. 277/361, 369, 277/400, 401, 399, 370

[56] References Cited

U.S. PATENT DOCUMENTS

| | | |
|---|---|---|
| 3,194,342 | 7/1965 | Heim . |
| 3,675,935 | 7/1972 | Ludwig et al. . |
| 3,679,217 | 7/1972 | Lesiecki . |
| 4,174,843 | 11/1979 | Arena et al. . |
| 4,196,911 | 4/1980 | Matsushita . |
| 4,212,475 | 7/1980 | Sedy ........................................ 277/400 |
| 4,290,611 | 9/1981 | Sedy . |
| 4,300,772 | 11/1981 | Nissel . |
| 4,305,593 | 12/1981 | Smith . |
| 4,491,331 | 1/1985 | Salant et al. . |
| 4,565,378 | 1/1986 | Wehrfritz et al. . |
| 4,884,945 | 12/1989 | Boutin et al. . |
| 4,961,678 | 10/1990 | Janocko . |
| 4,972,986 | 11/1990 | Lipschitz . |
| 4,990,054 | 2/1991 | Janocko . |
| 4,997,340 | 3/1991 | Zinsmeyer et al. . |
| 5,071,141 | 12/1991 | Lai et al. ............................. 277/361 X |
| 5,133,562 | 7/1992 | Lipschitz . |
| 5,180,173 | 1/1993 | Kimura et al. . |
| 5,193,974 | 3/1993 | Hufford . |
| 5,224,714 | 7/1993 | Kimura et al. . |
| 5,253,876 | 10/1993 | Gardner et al. . |
| 5,385,409 | 1/1995 | Ide ......................................... 277/400 |
| 5,464,227 | 11/1995 | Olson . |
| 5,490,679 | 2/1996 | Borrino et al. ........................ 277/369 |
| 5,498,007 | 3/1996 | Kulkarni et al. . |
| 5,501,470 | 3/1996 | Fuse et al. . |
| 5,529,315 | 6/1996 | Borrino et al. . |
| 5,529,318 | 6/1996 | Fuse et al. . |
| 5,531,458 | 7/1996 | Sedy . |
| 5,533,739 | 7/1996 | Sedy . |
| 5,556,111 | 9/1996 | Sedy . |
| 5,605,339 | 2/1997 | Pecht et al. . |
| 5,639,096 | 6/1997 | Ullah . |
| 5,658,127 | 8/1997 | Bond et al. . |
| 5,664,787 | 9/1997 | Fuse et al. . |

*Primary Examiner*—Anthony Knight
*Assistant Examiner*—Karlena D. Schwing
*Attorney, Agent, or Firm*—Sieberth & Patty, L.L.C.

[57] ABSTRACT

A gas seal assembly which in one embodiment comprises a seal ring having a plurality of annularly spaced-apart geometric impressions which cooperate with another seal ring having an annular groove into which opens a plurality of fluid pathways, the pathways placing the space between the sealing faces in fluid communication with an annular space defined by, inter alia, the sealing rings and a seal housing which contains the seal rings. The assembly enables a gas in the annular space to be recirculated between the annular space and the space between the seal faces to facilitate separation of the seal faces when sufficiently rotated relative to one another. In another embodiment, the gas seal assembly comprises a rotary seal ring disposed between two stationary seal rings. Methods of sealing the opening between a rotary shaft and an object through which the shaft extends are also disclosed.

52 Claims, 6 Drawing Sheets

GAS SEAL ASSEMBLY AND METHOD OF SEALING

TECHNICAL FIELD

This invention relates to gas seal assemblies and methods of sealing an opening between a rotary shaft and an object through which the rotary shaft extends.

BACKGROUND

Seals are known which employ a barrier fluid in combination with stator and rotor seal rings to prevent leakage of product through the annular space around a rotary shaft extending through a pump housing wall or some other object. The barrier fluid typically functions to lubricate and cool the point of interface between the sealing faces and to prevent product from entering the sealing interface. However, the barrier fluid does not always prevent contact between the seal rings, with the less efficient, less stable seal assemblies permitting frictional wear, especially at lower rotations per minute, which reduces the useful life of the seal. In addition, when the barrier fluid is a gas which is distinct from the product being sealed and is injected into the seal, reducing the amount of barrier fluid used and reducing the amount which contaminates product being sealed have proven to be elusive goals.

A need therefore exists for a seal assembly which increases the stability of the sealing rings by reducing the speed at which efficient liftoff occurs at the interface of the sealing rings. A need also exists for a seal assembly which maximizes the efficiency of the barrier fluid in the seal assembly, reduces the amount of barrier fluid contamination, and minimizes the overall amount of barrier fluid required to operate the seal assembly.

SUMMARY OF THE INVENTION

The present invention is deemed to satisfy these needs in a highly efficient and unique way. In one embodiment, this invention provides a gas seal assembly for sealing an opening between a rotary shaft and an object through which the shaft extends. The gas seal assembly comprises:
a) a first seal ring which defines a first sealing face,
b) a second seal ring which defines a second sealing face opposite the first sealing face,
c) biasing means for biasing the sealing faces together, and
d) a seal housing which is sized to contain the seal rings and form an annular space which surrounds the seal rings.

The first and second seal rings are rotatable relative to one another, and the first sealing face defines a plurality of annularly spaced-apart geometric impressions which extend radially from a first intermediate diameter between the inner and outer diameters of each of the first and second sealing faces to a second intermediate diameter between the inner and outer diameters of each of the first and second sealing faces. The second seal ring further defines a plurality of annularly disposed fluid pathways which extend axially through the second seal ring thereby placing the annular space in fluid communication with an annular groove formed in the second sealing face. The annular groove has an outer annular groove diameter greater than the first intermediate diameter of the geometric impressions and an inner annular groove diameter which is greater than the inner diameter of the first sealing face. The seal assembly is configured so that the sealing faces are not in contact with one another when the rotary seal ring is sufficiently rotated. As used herein, sufficiently rotated means rotated at a sufficient number of rotations per minute so that the fluid pressure between the opposed sealing faces exceeds the biasing force urging the sealing faces together. In this embodiment, when the sealing faces are not in contact with one another, a gas may recirculate across the space between the sealing faces into the annular space and back through the fluid pathways to the annular groove. In contrast, when the sealing faces are in contact with one another, the flow of gas across the sealing faces is impeded.

As used throughout this specification and the appended claims, the term stationary when used in reference to a seal ring refers to a seal ring which is maintained in a non-rotatable relationship with a rotary shaft extending through the seal ring.

In a preferred embodiment of this invention, the seal housing defines a port through which the gas may flow into the annular space. This embodiment is particularly suited for injection of a barrier gas into the seal assembly to prevent product leakage through the opening.

In another preferred embodiment of this invention, the gas seal assembly comprises:
a) a first stationary seal ring which defines a first stationary sealing face,
b) a second stationary seal ring which defines a second stationary sealing face,
c) a rotary seal ring disposed between the first and second stationary seal rings, the rotary seal ring defining a first rotary sealing face opposite the first stationary sealing face and a second rotary sealing face opposite the second stationary sealing face,
d) biasing means for biasing the first rotary and stationary sealing faces together and for biasing the second rotary and stationary sealing faces together, and
e) a seal housing which is sized to contain the seal rings and to form an annular space which surrounds the seal rings, the housing defining a port through which a gas may flow into the annular space.

Each of the rotary sealing faces defines a plurality of annularly spaced-apart geometric impressions which extend radially from a first intermediate diameter between the inner and outer diameters of the respective rotary sealing face to a second intermediate diameter between the inner and outer diameters of the respective rotary sealing face. Each of the stationary seal rings further defines a plurality of annularly disposed fluid pathways which extend through their respective stationary seal ring so that the annular space is placed in fluid communication with an annular groove formed in the respective stationary sealing face, the annular groove having an outer annular groove diameter greater than the first intermediate diameter of the opposing geometric impressions and an inner annular groove diameter which is greater than the inner diameter of the respective stationary sealing face. Here again, the sealing faces are not in contact with one another when the rotary seal ring is sufficiently rotated. When the opposed sealing faces are not in contact with one another, the gas may recirculate across the space between the sealing faces into the annular space and back through the fluid pathways to their associated annular groove, and when the opposed sealing faces are in contact with one another, the flow of gas across the sealing faces is impeded. This embodiment provides the important feature of having the geometric impressions on the rotary seal face opposite from a stationary seal face which defines the annular groove and the fluid pathways, thereby maximizing the effective flow of gas through the fluid pathways and into the annular groove and opposing geometric impressions.

This invention also provides a method of sealing an opening between a rotary shaft and an object through which the shaft extends. The method comprises:

(a) inserting a seal housing into the opening between the rotary shaft and the object;

(b) attaching a rotary seal ring to the rotary shaft so that the rotary seal ring is placed in rotational relation with the rotary shaft, the rotary seal ring being contained by the seal housing and defining a rotary sealing face;

(c) biasing a stationary sealing face against the rotary sealing face, the stationary sealing face being formed by a stationary seal ring contained by the seal housing; and (d) injecting a gas through one of the seal rings into a plurality of geometric impressions in the seal face of the other seal ring so that (i) the sealing faces are not in contact with one another when the rotary seal ring is sufficiently rotated, (ii) when the sealing faces are not in contact with one another, the gas may recirculate across the space between the sealing faces into an annular space defined at least in part by the seal rings and the seal housing and back through the seal ring through which the gas was initially injected, and (iii) when the sealing faces are in contact with one another, the flow of gas across the sealing faces is impeded.

In yet another embodiment of this invention, an improvement to a method of sealing an opening between a rotary shaft and an object through which the shaft extends is provided. The improvement is made to a method which comprises maintaining at least a pair of axially-aligned seal rings within the opening, at least one of the seal rings being non-rotatable with the shaft and defining a non-rotatable sealing face and at least one of the seal rings being rotatable with the shaft and defining a rotatable sealing face. The improvement comprises biasing the sealing faces toward each other while injecting a gas through one of the non-rotatable seal rings and into both an annular groove in the non-rotatable sealing face and a plurality of geometric impressions in the rotatable sealing face of the opposing rotary seal ring such that at least a portion of the gas is moved radially outwardly in the geometric impressions by centrifugal force toward a more peripheral loci and across the seal faces when they are separated from one another, and recirculating at least a portion of the gas back through the non-rotatable seal ring.

These and other embodiments and features of the invention will become still further apparent from the ensuing description, appended claims and accompanying drawings.

BRIEF DESCRIPTION OF THE DRAWINGS

FIG. 2 is also an end view of the embodiment of FIG. 7.

In each of the above figures, like numerals are used to refer to like or functionally like parts among the several figures.

DETAILED DESCRIPTION OF THE INVENTION

As may now be appreciated, the seal assembly of this invention provides a mechanism for pressurized gas flowing through or within the seal housing to provide an additional separating force to assist the sealing faces apart during shaft rotation. In this way, the amount of rotation required before liftoff or separation of the sealing faces occurs is reduced, and the concomitant level of wear is reduced.

Figure 1:
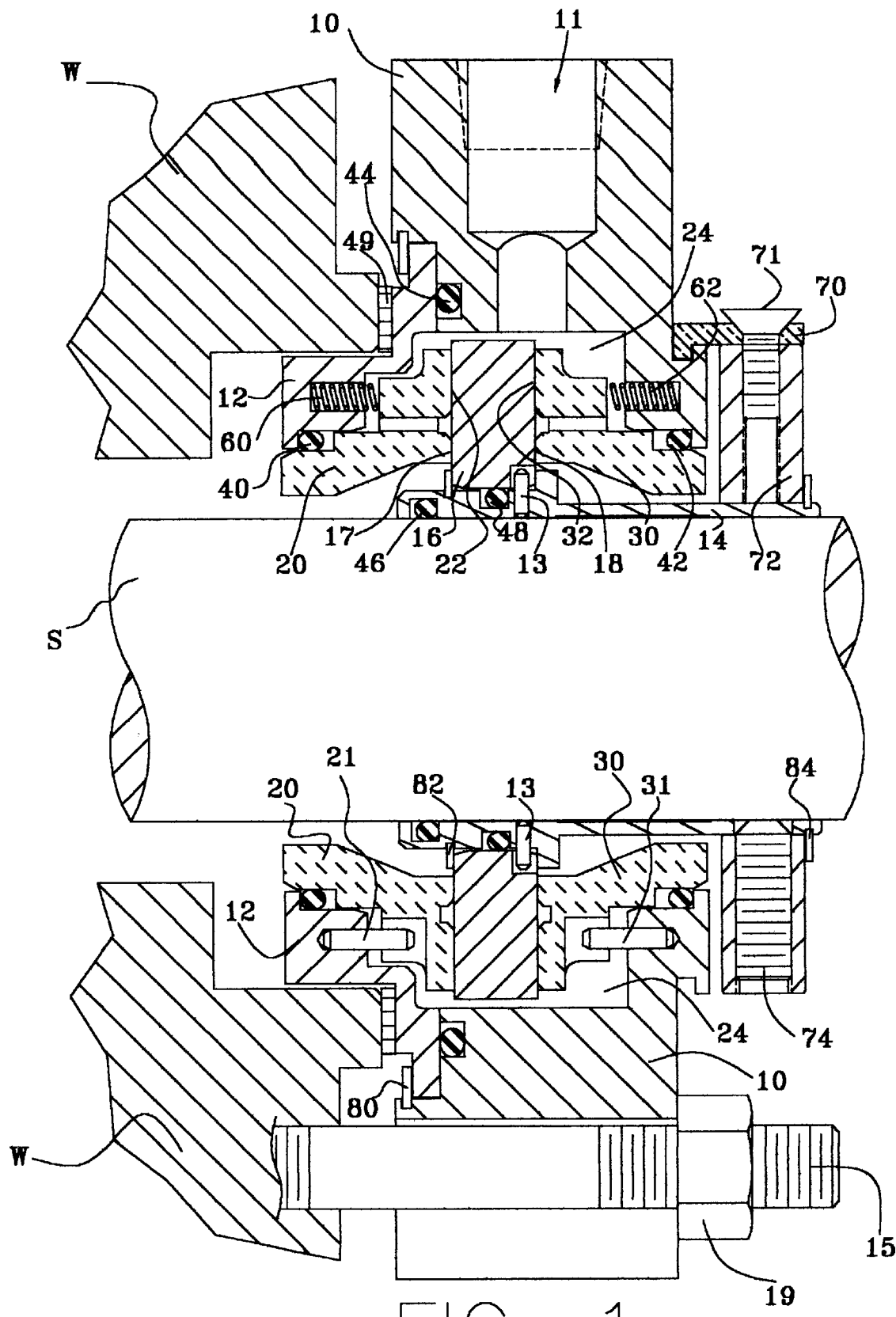
FIG. 1 is cross-sectional view of a preferred embodiment of this invention, taken along line K—K of FIG. 2.

Referring now to the accompanying figures, FIGS. 1–6B illustrate a preferred seal assembly of this invention. FIG. 1 illustrates a cross-section of the assembly as installed in an opening between a rotary shaft S and a pump housing wall W, taken along line K-K of FIG. 2. The seal assembly comprises a seal housing comprised of a gland 10 and a gland adapter 12, a sleeve 14 attached to shaft S, a rotary seal ring 16 connected to sleeve 14 by a plurality of radially extending drive pins 13, an inboard stationary seal ring 20, and an outboard stationary seal ring 30. Gland 10 is attached to wall W by a plurality of bolts 15 and nuts 19. Rotary seal ring 16 defines an inboard rotary seal face 17 and an outboard rotary seal face 18. Inboard stationary seal ring 20 defines an inboard stationary seal face 22, while outboard stationary seal ring 30 defines an outboard stationary seal face 32. A plurality of anti-rotation pins 21 connect inboard stationary seal ring 20 to gland adapter 12, while a plurality of anti-rotation pins 31 connect outboard stationary seal ring 30 to gland 10. Gland 10 also defines a port 11 through which pressurized gas (preferably an inert gas, e.g., nitrogen) may be injected through gland 10 and into an annular space 24 defined by gland 10, adapter 12, rings 16, 20, and 30, and O-rings 40, 42 and 44 (hereinafter described) to provide a gas barrier at the point of contact between seal faces 17 and 22 and contact between seal faces 18 and 32.

Figures 6A, 6B:
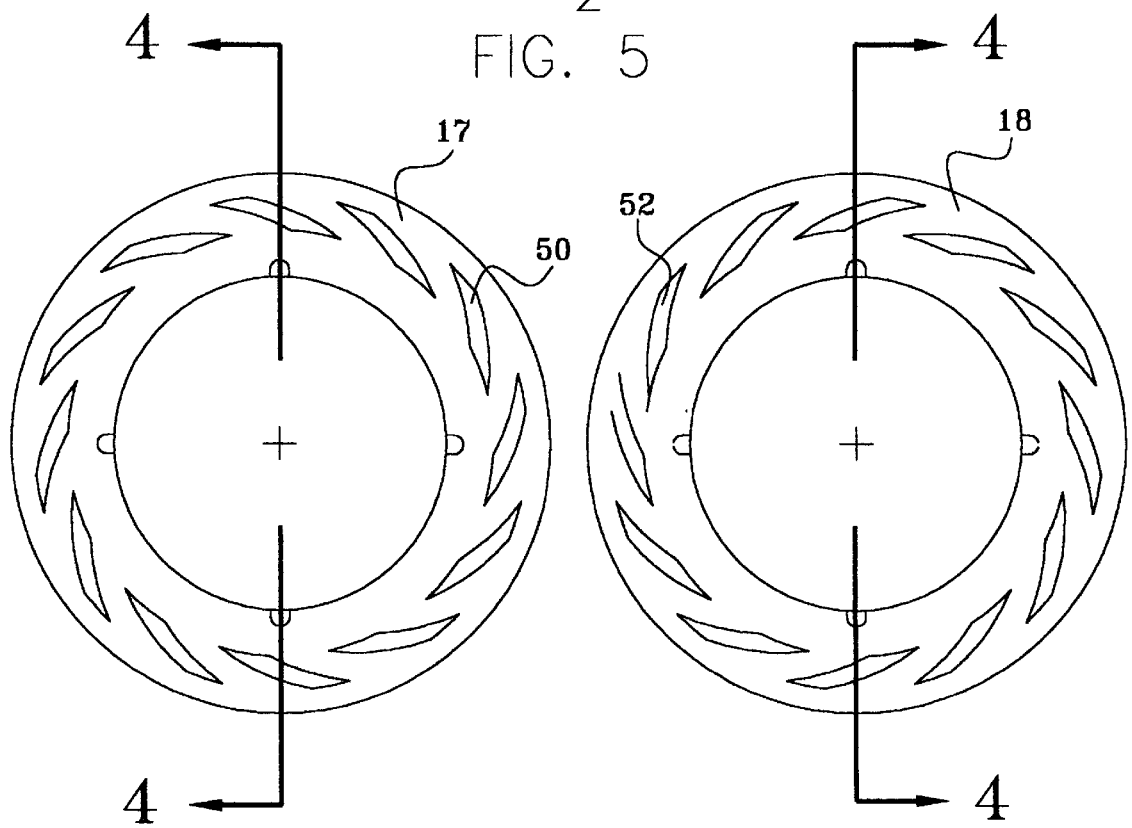
FIG. 6A is a plan view of one seal face of the rotary seal ring of the device of FIG. 1.
FIG. 6B is a plan view of the other seal face of the rotary seal ring of the device of FIG. 1.

Rotary seal face 17 includes a plurality of annularly spaced apart geometric impressions, namely arcuate grooves 50 as shown on FIG. 6A, and rotary seal face 18 includes a plurality of annularly spaced apart geometric impressions, namely arcuate grooves 52 as shown on FIG. 6B, the arcuate groove patterns formed in seal faces 17 and 18 being mirror images of one another. As may be seen in FIG. 4, grooves 50 extend radially outwardly from a first intermediate diameter L between the inner and outer diameter of rotary sealing face 17 and between the inner and outer diameter of opposing stationary sealing face 22, to a second intermediate diameter M between the inner and outer diameters of rotary sealing face 17 and between the inner and outer diameters of opposing stationary sealing face 22. Likewise, grooves 52 extend radially outwardly from a first intermediate diameter N between the inner and outer diameter of rotary sealing face 18 and between the inner and outer diameter of opposing stationary sealing face 32, to a second intermediate diameter P between the inner and outer diameters of rotary sealing face 18 and between the inner and outer diameters of opposing stationary sealing face 32.

Figure 3A:
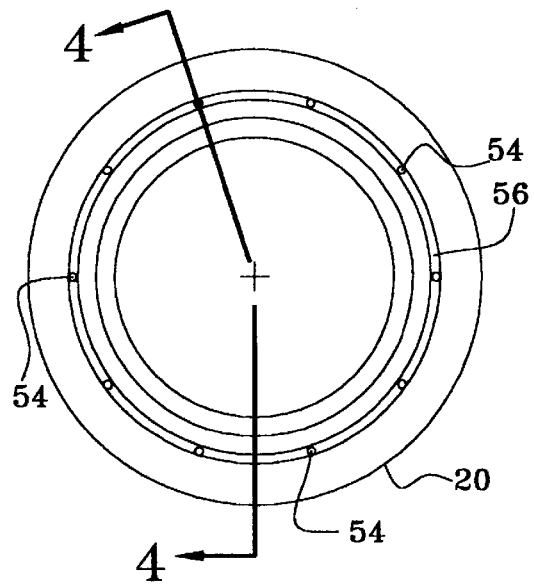
FIG. 3A is a partially phantom plan view of the inboard stationary seal ring of the device of FIG. 1.
Figure 3B:
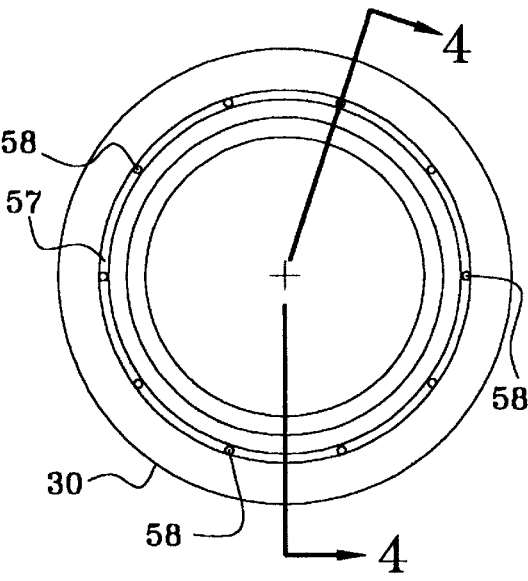
FIG. 3B is a partially phantom plan view of the outboard stationary seal ring of the device of FIG. 1.
Figure 4:
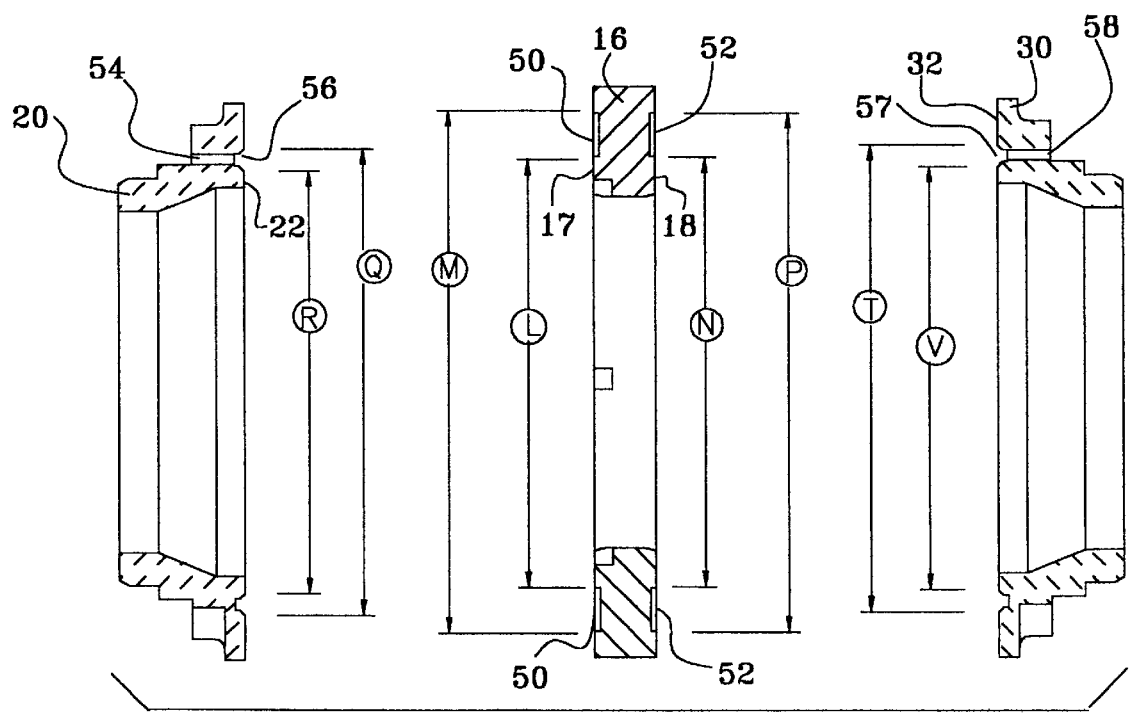
FIG. 4 is a cross-sectional, exploded view of the three seal rings of the device of FIG. 1, taken along line 4—4 of FIGS. 3A, 3B, 6A and 6B.

As may be seen for example in FIGS. 3A, 3B and 4, inboard stationary seal ring 20 further defines a plurality of annularly disposed fluid pathways 54 which extend axially through seal ring 20 thereby placing annular space 24 in fluid communication with an annular groove 56 formed in sealing face 22. Annular groove 56 has an outer annular groove diameter Q greater than the first intermediate diameter L of grooves 50 and an inner annular groove diameter R which is greater than the inner diameter of rotary sealing face 17. Similarly, outboard stationary seal ring 30 further defines a plurality of annularly disposed fluid pathways 58 which extend axially through seal ring 30 thereby placing annular space 24 in fluid communication with an annular groove 57 formed in sealing face 32. Annular groove 57 has an outer annular groove diameter T greater than the first intermediate diameter N of grooves 52 and an inner annular groove diameter V which is greater than the inner diameter of rotary sealing face 18.

Referring again to FIG. 1, a first O-ring 40 provides a seal between gland adapter 12 and stationary seal ring 20, while a second O-ring 42 provides a seal between gland 10 and stationary seal ring 30. A third O-ring 44 provides a seal between gland adapter 12 and gland 10. Likewise, the space between sleeve 14 and shaft S is sealed by a fourth O-ring 46, while a fifth O-ring 48 provides another seal between sleeve 14 and rotary seal ring 16. A gasket 49 is also provided to seal space between wall W and gland adapter 12. While the preferred elastomeric means depicted for providing these seals are O-rings and gaskets, any conventional elastomeric device may be used to provide the necessary seals in the assembly.

With reference to FIG. 1 it can be seen that the depicted seal assembly further comprises biasing means in the form of a plurality of annularly disposed compression springs 60 disposed between the gland adapter 12 and inboard stationary seal ring 20, and a plurality of annularly disposed compression springs 62 disposed between gland 10 and outboard stationary seal ring 30. Springs 60 and 62 bias the stationary seal ring faces towards their opposing rotary seal face defined by rotary seal ring 16. A plurality of spacers 70 are attached by corresponding cap screws 71 to a collar 72, which in turn is connected to sleeve 14. Spacers 70 are provided to facilitate installation of the seal assembly. A plurality of set screws 74 also are provided to attach sleeve 14, via collar 72, to rotary shaft S. Once set screws 74 are installed, spacers 70 and cap screws 71 may be removed from the assembly. Metal clasp bands 80, 82, and 84 are also provided to facilitate retention of the seal assembly components together during use.

The preferred rings seal rings of this invention typically has a balance in the range of about 0.60 to about 1.25, more preferably in the range of about 0.70 to about 1.00, and most preferably in the range of about 0.72 to about 0.92. The geometric impressions (as depicted, the arcuate grooves) preferably have a depth in the range of about 0.0001 inch to about 0.0005 inch, more preferably in the range of about 0.0001 to about 0.0003 inch, and most preferably about 0.00025 inch. These depths are particularly effective for damming gas to generate stable sealing face separation. It should be noted that the geometric impressions in the seal faces of this invention, while preferably taking the shape of arcuate grooves as depicted in the figures, can take the shape of a wide variety of geometric shapes such as, for example, circles, triangles, linear grooves, rectangles, squares, and the like, so long as the geometric impression is effective at damming gas at the interface of the seal rings to create a sufficient positive pressure for separation of the seal faces.

The dam width ratio of each of the rotary seal faces may be calculated using the following formula:

$$\text{Dam Width Ratio} = [(\text{O.D.} - \text{I.D.}) - \text{GL}]/(\text{O.D.} - \text{I.D.})$$

where GL=second intermediate diameter−first intermediate diameter, I.D.=face inner diameter, and O.D.=face outer diameter. When using this formula, the dam width ratio of both rotary seal faces is preferably in the range of about 0.40 to about 0.80, more preferably in the range of about 0.45 to about 0.75, and most preferably in the range of about 0.55 to about 0.63.

As may now be appreciated, when the seal assembly is in use, the arcuate grooves 50 and 52 of rotary seal faces 17 and 18, respectively, in combination with the gas flowing through pathways 54 and 58 in stationary seal rings 20 and 30, respectively, cause stationary seal faces 22 and 32 to separate from opposing rotary seal faces 17 and 18, respectively, once a threshold level of pressure between the seal faces is reached and compression springs 60 and 62 are compressed sufficiently. See in this regard FIG. 5, which illustrates the recirculation of the nitrogen gas across the seal faces when those faces are separated. The seal assembly is configured to cause a portion of the gas to leak from the seal housing radially inwardly and out of the seal assembly. However, a portion of the gas also flows radially outwardly into the annular space 24 (FIG. 1 only), enabling that portion of gas to be recirculated through the fluid pathways 54 and 58. The threshold level of pressure required for separation of the sealing faces is dependent at least in part upon the rate of rotary seal ring rotation, the pressure of the gas injected into the seal assembly, and the particular geometric characteristics of the seal faces. Once the stationary seal faces separate from their respective rotary seal faces, at least a portion of the gas circulates through fluid pathways 54 and 58 and out radially across the space between the corresponding rotary and stationary seal faces. The gas may then recirculate back through the fluid pathways 54 and 58 from the annular space 24, into annular grooves 56 and 57, and back into the space between the opposing seal faces. As may be seen from FIGS. 4, 5, 6A and 6B, the arcuate grooves 50 and 52 in respective rotary seal faces 17 and 18 extend between, but are spaced away from, the outer and inner diameters of rotary seal ring 16 in such a way that arcuate grooves 50 and 52 cooperate with pathways 54 and 58, respectively, and the annular grooves 56 and 57, respectively, in the opposing stationary seal rings to capture and dam gas flowing through the apertures, thereby reducing the rotational speed required to achieve liftoff.

Figure 5:
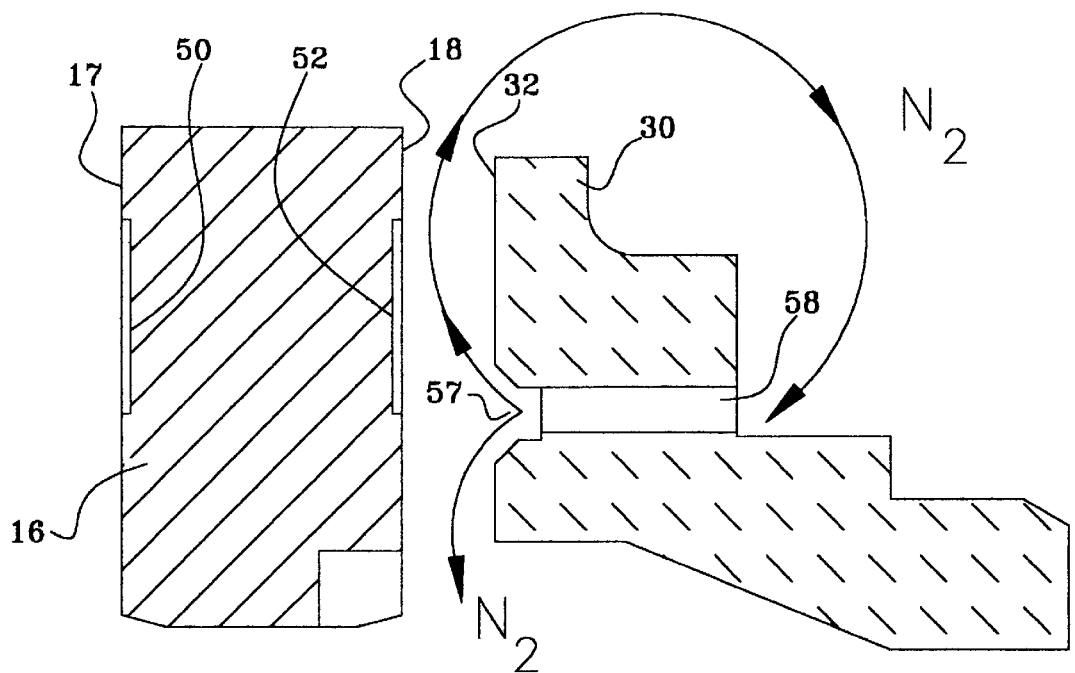
FIG. 5 is a fragmentary cross-sectional view of the interface between the rotary seal ring and the outboard stationary seal ring of the device of FIG. 1, while the respective seal faces are separated froth one another.

As depicted in FIGS. 1, 4 and 5, the edges of the annular grooves 56 and 57 are chamfered. It should be understood that the inner and outer diameters of these annular grooves, i.e., diameters R, Q, T and V, are measured from the outermost edges of the chamfered surfaces. In particularly preferred embodiments, the inner annular groove diameters R and V are equal to or less than the first intermediate diameters L and N, respectively, of arcuate grooves 50 and 52, respectively. This feature, in combination with the particular placement of the arcuate grooves on their respective seal face, provides added stability to the seal assembly by enabling the full use of the volume created by the geometric impressions for efficient generation of positive pressure during rotary seal ring rotation, which in turn provides evenly annularly distributed force for separation of the sealing faces.

FIGS. 6A and 6B illustrate, respectively, the plan view of the inboard and outboard seal faces 17 and 18 of rotary seal ring 16. In this seal, the arcuate grooves are only in the seal faces of rotary seal ring 16. However, it will be appreciated that FIGS. 6A and FIG. 6B may be used to illustrate, respectively, plan views of the geometric impressions of two alternative seal configurations. Thus, FIG. 6A can also be viewed as illustrating the rotary seal face of a seal which has only one stationary seal ring and only one rotary seal ring, wherein the geometric impressions are formed by the rotary seal face and the annular groove is formed by the stationary seal face. See in this regard FIGS. 7 and 8 discussed in detail below. Likewise, FIG. 6B can also be viewed as illustrating the stationary seal face of a less preferred seal which has only one stationary seal ring and only one rotary seal ring, wherein the geometric impressions are formed by the stationary seal face and the annular groove is formed by the rotary seal face. Thus, while the preferred seal assembly of this invention has two stationary seal rings and one rotary seal ring, this invention also envisions embodiments which have one stationary and one rotary seal ring within the seal assembly. Those of skill in the art will also appreciate that the scope of this invention encompasses other seal assemblies having a pair of interfacing stationary and rotary seal rings, with or without introduction of a barrier gas through a port defined by the seal housing.

Figure 2:
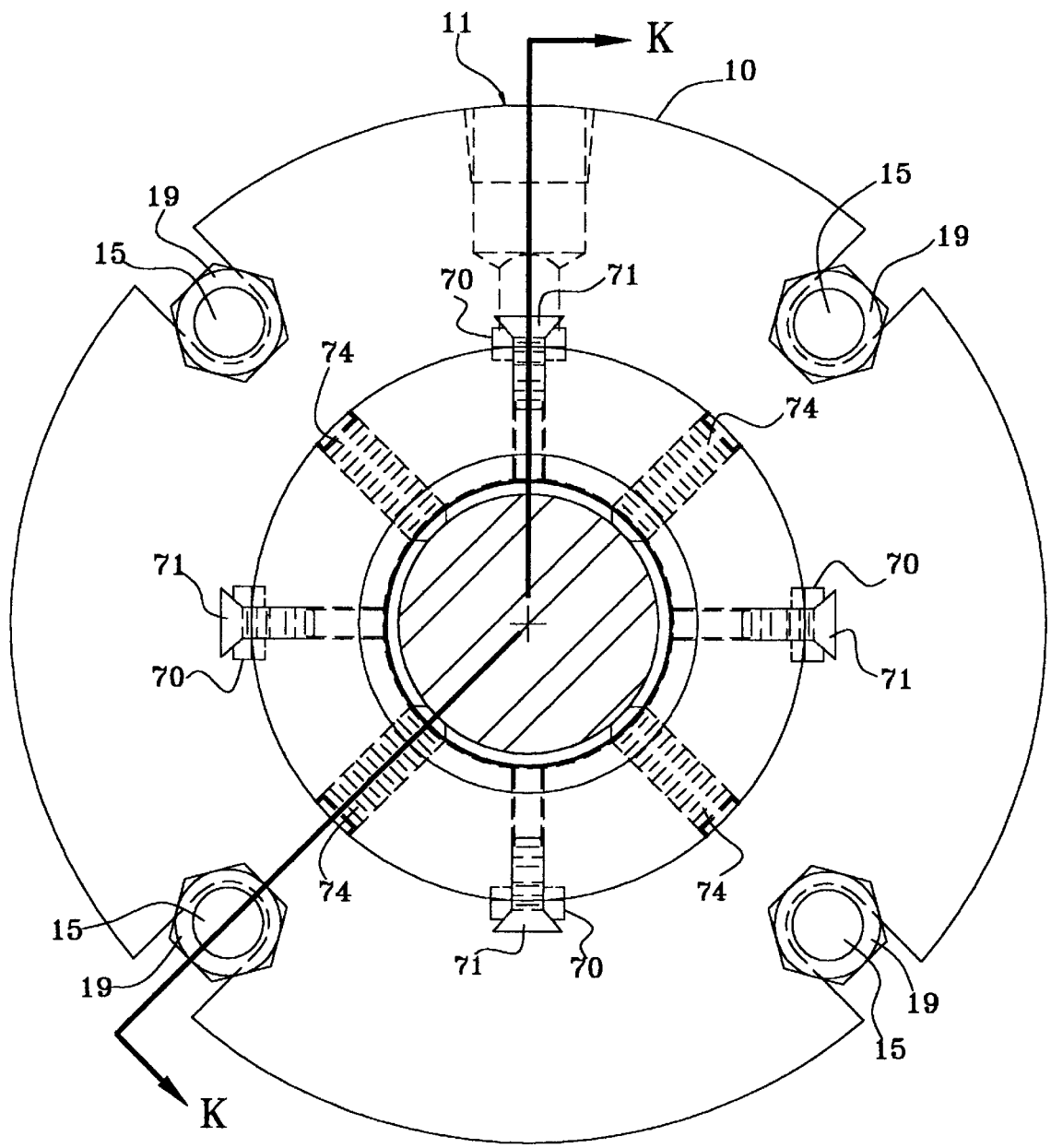
FIG. 2 is a partially phantom end plan view of the embodiment of either of FIGS. 1 and 8 when installed upon a rotary shaft. With phantom lines deleted.
Figure 7:
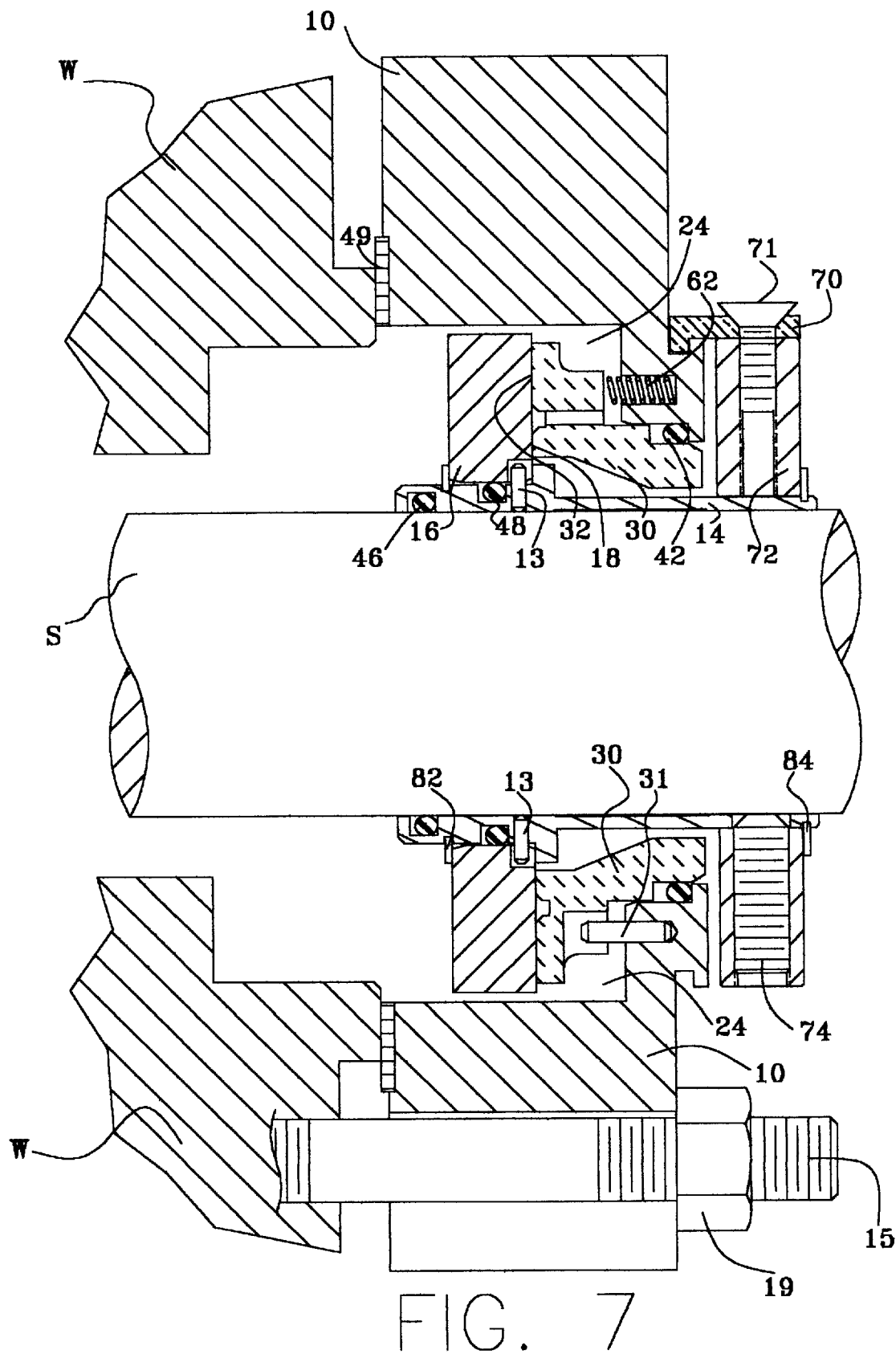
FIG. 7 is a cross-sectional view of another embodiment of this invention, taken along line K—K of FIG. 2 (phantom lines in FIG. 2 being disregarded).
Figure 8:
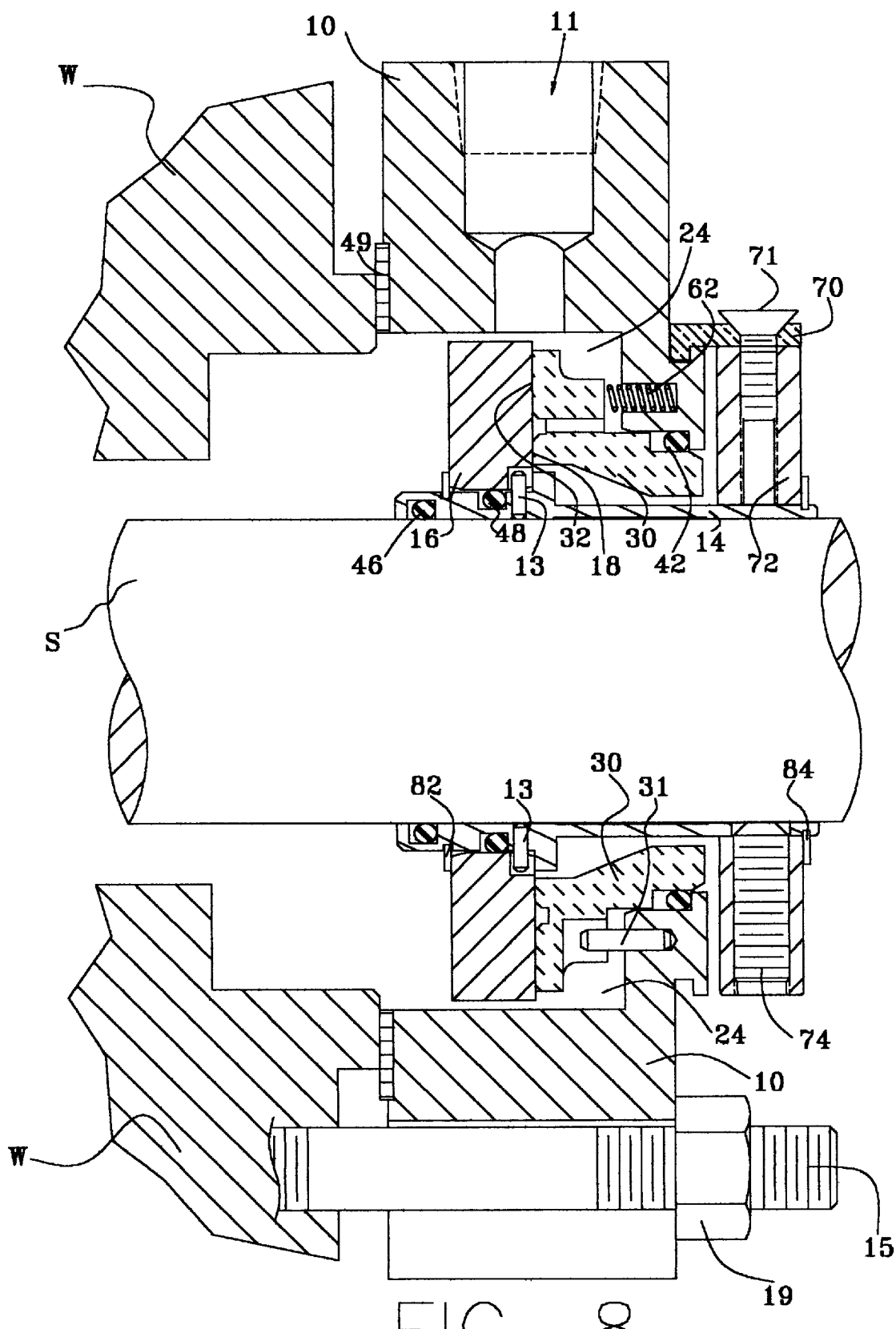
FIG. 8 is a cross-sectional view of yet another embodiment of this invention, taken along line K—K of FIG. 2.

FIGS. 7 and 8 illustrate alternative embodiments of this invention, each including only a single stationary seal ring and a single rotary seal ring. These embodiments are particularly adapted for sealing gas products from flowing through an opening between wall W and rotary shaft S. Specifically, FIG. 7 illustrates a seal assembly having a housing 10 which does not define a port for the injection of a barrier gas in the assembly, but which permits a gas product which is being sealed to flow into annular space 24. As is evident from FIGS. 7 and 8, and in contrast to FIG. 1, the inboard side of annular space 24 is not sealed by any inboard stationary seal ring, seal housing structure, O-rings or the like. In the particular embodiment of FIG. 7, the gas product being sealed also acts as the barrier gas recirculated through the fluid pathways, into the annular groove and geometric impressions, and across the separated sealing faces. FIG. 8 differs from FIG. 7 in that the assembly depicted in FIG. 8 does provide port 11 formed by seal housing 10 so that a gas may be introduced into the seal assembly to form a gas barrier between the product being sealed and the atmosphere. It should also be noted that FIG. 2 illustrates, inter alia, an end plan view of the embodiment of FIG. 8, and when the phantom lines for port 11 are removed or disregarded, FIG. 2 illustrates an end plan view of the embodiment of FIG. 7.

As one might expect, the various embodiments of this invention may be fabricated using a variety of dimensions and materials, depending in large part upon the size of a particular shaft and bearing housing aperture with which the device will be used. The gland and gland adapter housing components of this invention may be fabricated from a variety of materials, including stainless steel, brass, other metal alloys and resilient plastics. Preferred materials include 316 stainless steel for the gland and adapter. The biasing means typically used in the practice of this invention will be a plurality of compression springs retained so as to have an axis which is parallel to the rotary shaft axis, although a variety of alternative biasing means may be employed, including, for example, canted coils, wave springs, leaf springs, and bands of resilient copolymers. Again, when compression springs are used, the springs may be fabricated from a number of resilient materials, with Hastelloy® C-276 being particularly preferred for its corrosion-resistant properties. The elastomeric means employed in the device may be O-rings, box strips, or other suitable elastomeric materials which can provide a seal. However, conventional O-rings fabricated with standard rubber compositions are preferred. The pins, screws and bolts utilized in preferred embodiments also may be fabricated from a variety of materials, including stainless steel, brass, other metal alloys and resilient plastics. The number of screws, bolts, pins and clips used may vary depending upon the shaft diameter. With regard to each component of this device, the particular material used to fabricate a particular component may vary depending upon the use to which the device will be put.

The seal rings may be fabricated from a wide variety of materials. Non-limiting examples of suitable materials include carbon, silicon carbide, carbon composites, ceramics, and tungsten carbide, with carbon and silicon carbide being preferred, and silicon carbide being particularly preferred. When the seal faces are composed entirely of carbon or silicon carbide materials, the amount of friction-generated heat is minimized and durable wear surfaces are provided which maintain their original flat surface characteristics, even if abrasives from the material sealed manage to enter space between the seal faces.

The barrier fluid employed in the seal assemblies and methods of this invention is a gas. The gas may be the product which is being sealed, or it may be a barrier gas which is being injected into the seal assembly and which is distinct from the product. When the gas is being injected as a barrier fluid, it is preferably an inert gas. Nitrogen is a particularly preferred inert gas. Also, when the gas being injected into the seal assembly, it is preferably injected at a pressure of about 30 psi to about 300 psi. When the gas is also the product being sealed, it is preferably at a pressure of about 0 psi to about 300 psi.

As may now be appreciated from the foregoing, rotary seal ring 16 in the preferred embodiment depicted is attached to shaft S by way of drive pins 13 which attached ring 16 to sleeve 14, which in turn is attached to shaft S by set screws 74. In this way, rotary seal ring 16 is placed in rotational relation with the rotary shaft S. However, various alternative methods of attachment of the rotary seal ring to the rotary shaft may be used, so long as the rotary seal ring is placed in rotational relationship with the rotary shaft. Stationary sealing faces 22 and 32 as depicted are biased against rotary sealing faces 17 and 18 respectively by way of compression springs 60 and 62 respectively. However, virtually any method of axially biasing these sealing faces together may be employed, so long as the seal faces are placed in sealing contact with one another when the rotary seal ring is not rotating.

It should also be appreciated from the foregoing that the pressurized gas injected into the seal assembly recirculates back through stationary seal rings 20 and 30 on account of the centrifugal force generated during rotation of rotary seal ring 16, the separation of the seal faces due to the interaction of the rotary seal faces with their opposing stationary seal faces, and the pressure maintained in annular space 24 by a gas source feeding pressurized gas into annular space 24. The centrifugal force acts to move at least a portion of the gas in the geometric impressions radially toward a more peripheral loci proximate the second intermediate diameter of the geometric impressions. This is believed to have the effect of moving the point of pressure buildup within the geometric impressions outward radially, which in turn is believed to increase the stability of the seal assembly. These unique features also provide a savings in the amount of gas required for maintaining a sufficient barrier at the junction of the sealing faces, while also enabling the use of the force of the pressurized gas to facilitate sealing face liftoff during rotation of the rotary shaft.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A gas seal assembly for sealing an opening between a rotary shaft and an object through which the shaft extends, the seal assembly comprising:
    a) a first seal ring which defines a first sealing face,
    b) a second seal ring which defines a second sealing face opposite the first sealing face,
    c) biasing means for biasing the sealing faces together, and
    d) a seal housing which is sized to contain the seal rings and form an annular space which surrounds the seal rings,
    wherein the first and second seal rings are rotatable relative to one another, wherein the first sealing face defines a plurality of annularly spaced-apart geometric impressions which extend radially from a first intermediate diameter between the inner and outer diameters of each of the first and second sealing faces to a second intermediate diameter between the inner and outer diameters of each of the first and second sealing faces, and wherein the second seal ring further defines a plurality of annularly disposed fluid pathways which extend through the second seal ring thereby placing the annular space in fluid communication with an annular groove formed in the second sealing face, the annular groove having an outer annular groove diameter greater than the first intermediate diameter of the geometric impressions and an inner annular groove diameter which is greater than the inner diameter of the first sealing face, so that (i) the sealing faces are not in contact with one another when the rotary seal ring is sufficiently rotated, (ii) when the sealing faces are not in contact with one another, a gas may recirculate across the space between the sealing faces into the annular space and back through the fluid pathways to the annular groove, and (iii) when the sealing faces are in contact with one another, the flow of gas across the sealing faces is impeded.

2. A gas seal assembly according to claim 1 wherein the biasing means is comprised of a plurality of annularly disposed compression springs disposed between the housing and one of the seal rings.

3. A gas seal assembly according to claim 1 wherein the inner annular groove diameter is equal to or less than the first intermediate diameter of the geometric impressions.

4. A gas seal assembly according to claim 1 wherein the seal assembly has a balance in the range of about 0.60 to about 1.25.

5. A gas seal assembly according to claim 4 wherein the balance is in the range of about 0.70 to about 1.00.

6. A gas seal assembly according to claim 5 wherein the balance is in the range of about 0.72 to about 0.92.

7. A gas seal assembly according to claim 1 wherein the geometric impressions are arcuate grooves.

8. A gas seal assembly according to claim 7 wherein the arcuate grooves have a depth in the range of about 0.0001 inch to about 0.0005 inch.

9. A gas seal assembly according to claim 8 wherein the depth is in the range of about 0.0001 inch to about 0.0003 inch.

10. A gas seal assembly according to claim 9 wherein the depth is about 0.00025 inch.

11. A gas seal assembly according to claim 1 wherein the dam width ratio is in the range of about 0.40 to about 0.80 and is calculated using the following formula:

Dam Width Ratio=[(O.D.−I.D.)−GL]÷(O.D.−I.D.)

where GL=second intermediate diameter−first intermediate diameter, I.D.=face inner diameter, and O.D.=face outer diameter.

12. A gas seal assembly according to claim 11 wherein the dam width ratio is in the range of about 0.45 to about 0.75.

13. A gas seal assembly according to claim 11 wherein the geometric impressions are arcuate grooves.

14. A gas seal assembly according to claim 12 wherein the seal assembly has a balance in the range of about 0.60 to about 1.25.

15. A gas seal assembly according to claim 14 wherein the geometric impressions are arcuate grooves.

16. A gas seal assembly according to claim 15 wherein the inner annular groove diameter is equal to or less than the first intermediate diameter of the arcuate grooves.

17. A gas seal assembly according to claim 1 wherein the seal housing defines a port through which the gas may flow into the annular space.

18. A gas seal assembly according to claim 17 wherein the biasing means is comprised of a plurality of annularly disposed compression springs disposed between the housing and one of the seal rings.

19. A gas seal assembly according to claim 17 wherein the inner annular groove diameter is equal to or less than the first intermediate diameter of the geometric impressions.

20. A gas seal assembly according to claim 17 wherein the seal assembly has a balance in the range of about 0.60 to about 1.25.

21. A gas seal assembly according to claim 20 wherein the balance is in the range of about 0.70 to about 1.00.

22. A gas seal assembly according to claim 21 wherein the balance is in the range of about 0.72 to about 0.92.

23. A gas seal assembly according to claim 17 wherein the geometric impressions are arcuate grooves.

24. A gas seal assembly according to claim 23 wherein the arcuate grooves have a depth in the range of about 0.0001 inch to about 0.0005 inch.

25. A gas seal assembly according to claim 24 wherein the depth is in the range of about 0.0001 inch to about 0.0003 inch.

26. A gas seal assembly according to claim 25 wherein the depth is about 0.00025 inch.

27. A gas seal assembly according to claim 17 wherein the dam width ratio is in the range of about 0.40 to about 0.80 and is calculated using the following formula:

Dam Width Ratio=[(O.D.−I.D.)−GL]÷(O.D.−I.D.)

where GL=second intermediate diameter−first intermediate diameter, I.D.=face inner diameter, and O.D.=face outer diameter.

28. A gas seal assembly according to claim 27 wherein the dam width ratio is in the range of about 0.45 to about 0.75.

29. A gas seal assembly according to claim 28 wherein the seal assembly has a balance in the range of about 0.60 to about 1.25.

30. A gas seal assembly according to claim 29 wherein the geometric impressions are arcuate grooves.

31. A gas seal assembly according to claim 30 wherein the inner annular groove diameter is equal to or less than the first intermediate diameter of the arcuate grooves.

32. A gas seal assembly according to claim 27 wherein the geometric impressions are arcuate grooves.

33. A gas seal assembly for sealing an opening between a rotary shaft and an object through which the shaft extends, the seal assembly comprising:
   a) a first stationary seal ring which defines a first stationary sealing face,
   b) a second stationary seal ring which defines a second stationary sealing face,
   c) a rotary seal ring disposed between the first and second stationary seal rings, the rotary seal ring defining a first rotary sealing face opposite the first stationary sealing face and a second rotary sealing face opposite the second stationary sealing face,
   d) biasing means for biasing the first rotary and stationary sealing faces together and for biasing the second rotary and stationary sealing faces together, and
   e) a seal housing which is sized to contain the seal rings and to form an annular space which surrounds the seal rings, the housing defining a port through which a gas may flow into the annular space,
   wherein each of the rotary sealing faces defines a plurality of annularly spaced-apart geometric impressions which extend radially from a first intermediate diameter between the inner and outer diameters of the respective rotary sealing face to a second intermediate diameter between the inner and outer diameters of the respective rotary sealing face, and wherein each of the stationary seal rings further defines a plurality of annularly disposed fluid pathways which extend through their respective stationary seal ring so that the annular space is placed in fluid communication with an annular groove formed in the respective stationary sealing face, the annular groove having an outer annular groove diameter greater than the first intermediate diameter of the opposing geometric impressions and an inner annular groove diameter which is greater than the inner diameter of the respective stationary sealing face, so that (i) the sealing faces are not in contact with one another when the rotary seal ring is sufficiently rotated, (ii) when the opposed sealing faces are not in contact with one another, the gas may recirculate across the space between the sealing faces into the annular space and back through the fluid pathways to their associated annular groove, and (iii) when the opposed sealing faces are in contact with one another, the flow of gas across the sealing faces is impeded.

34. A gas seal assembly according to claim 33 wherein the biasing means is comprised of a plurality of annularly disposed compression springs disposed between the housing and one of the seal rings.

35. A gas seal assembly according to claim 33 wherein the inner annular groove diameter is equal to or less than the first intermediate diameter of the opposing geometric impressions.

36. A gas seal assembly according to claim 33 wherein the seal assembly has a balance in the range of about 0.60 to about 1.25.

37. A gas seal assembly according to claim 36 wherein the balance is in the range of about 0.70 to about 1.00.

38. A gas seal assembly according to claim 37 wherein the balance is in the range of about 0.70 to about 0.90.

39. A gas seal assembly according to claim 33 wherein the geometric impressions are arcuate grooves.

40. A gas seal assembly according to claim 39 wherein the arcuate grooves have a depth in the range of about 0.0001 inch to about 0.0005 inch.

41. A gas seal assembly according to claim 40 wherein the depth is in the range of about 0.0001 inch to about 0.0003 inch.

42. A gas seal assembly according to claim 41 wherein the depth is about 0.00025 inch.

43. A gas seal assembly according to claim 33 wherein the dam width ratio is in the range of about 0.40 to about 0.80 and is calculated using the following formula:

Dam Width Ratio=[(O.D.−I.D.)−GL]÷(O.D.−I.D.)

where GL=second intermediate diameter−first intermediate diameter, I.D.=face inner diameter, and O.D.=face outer diameter.

44. A gas seal assembly according to claim 43 wherein the dam width ratio is in the range of about 0.45 to about 0.75.

45. A gas seal assembly according to claim 43 wherein the geometric impressions are arcuate grooves.

46. A gas seal assembly according to claim 43 wherein the seal assembly has a balance in the range of about 0.60 to about 1.25.

47. A gas seal assembly according to claim 46 wherein the geometric impressions are arcuate grooves.

48. A gas seal assembly according to claim 47 wherein the inner annular groove diameter is equal to or less than the first intermediate diameter of the arcuate grooves.

49. A method of sealing an opening between a rotary shaft and an object through which the shaft extends, the method comprising:
   (a) inserting a seal housing into the opening between the rotary shaft and the object;
   (b) attaching a rotary seal ring to the rotary shaft so that the rotary seal ring is placed in rotational relation with the rotary shaft, the rotary seal ring being contained by the seal housing and defining a rotary sealing face;
   (c) biasing a stationary sealing face against the rotary sealing face, the stationary sealing face being formed by a stationary seal ring contained by the seal housing; and
   (d) injecting a gas through one of the seal rings into a plurality of geometric impressions in the seal face of the other seal ring so that (i) the sealing faces are not in contact with one another when the rotary seal ring is sufficiently rotated, (ii) when the sealing faces are not in contact with one another, the gas may recirculate across the space between the sealing faces into an annular space defined at least in part by the seal rings and the seal housing and back through the seal ring through which the gas was initially injected, and (iii) when the sealing faces are in contact with one another, the flow of gas across the sealing faces is impeded.

50. A method according to claim 49 wherein the geometric impressions are arcuate grooves.

51. In a method of sealing an opening between a rotary shaft and an object through which the shaft extends, the method comprising maintaining at least a pair of axially-aligned seal rings within the opening, at least one of the seal rings being non-rotatable with the shaft and defining a non-rotatable sealing face and at least one of the seal rings being rotatable with the shaft and defining a rotatable sealing face, the improvement which comprises biasing the sealing faces toward each other while injecting a gas through one of the non-rotatable seal rings and into both an annular groove in the non-rotatable sealing face and a plurality of geometric impressions in the rotatable sealing face of the opposing rotary seal ring such that at least a portion of the gas is moved radially outwardly in the geometric impressions by centrifugal force toward a more peripheral loci and across the seal faces when they are separated from one another, and recirculating at least a portion of the gas back through the non-rotatable seal ring.

52. A method according to claim 51 wherein the geometric impressions are arcuate grooves.

* * * * *

UNITED STATES PATENT AND TRADEMARK OFFICE
CERTIFICATE OF CORRECTION

PATENT NO. : 6,109,617
DATED : August 29, 2000
INVENTOR(S) : Frederick Christopher Laney It is certified that error appears in the above-identified patent and that said Letters Patent is hereby corrected as shown below:

Description, Column 5, line 50 reads "ring seal rings" and should read --seal--.

Signed and Sealed this

Twenty-ninth Day of May, 2001

Attest:

NICHOLAS P. GODICI

Attesting Officer     Acting Director of the United States Patent and Trademark Office